(12) United States Patent
Moliner Marin et al.

(10) Patent No.: US 8,007,765 B2
(45) Date of Patent: Aug. 30, 2011

(54) MICROPOROUS CRYSTALLINE MATERIAL, ZEOLITE ITQ-37, PREPARATION METHOD AND USE

(75) Inventors: Manuel Moliner Marin, Valencia (ES); Maria Jose Diaz Cabanas, Valencia (ES); Angel Cantin Sanz, Valencia (ES); Avelino Corma Canos, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 502 days.

(21) Appl. No.: 12/280,590

(22) PCT Filed: Feb. 22, 2007

(86) PCT No.: PCT/ES2007/070036
§ 371 (c)(1),
(2), (4) Date: Dec. 8, 2008

(87) PCT Pub. No.: WO2007/099190
PCT Pub. Date: Sep. 7, 2007

(65) Prior Publication Data
US 2009/0220661 A1   Sep. 3, 2009

(30) Foreign Application Priority Data
Feb. 28, 2006   (ES) .................. 200600584

(51) Int. Cl.
*C01B 39/46* (2006.01)
*C01B 39/48* (2006.01)

(52) U.S. Cl. ........ 423/718; 423/704; 423/705; 423/709; 502/60; 502/61; 502/74; 208/111.01; 208/111.2; 208/111.3; 208/120.1; 208/120.2; 208/120.3; 208/120.35; 208/136; 208/146

(58) Field of Classification Search ............. 423/704, 423/705, 706, 709, 718; 502/60, 61, 74; 208/111.01, 111.2, 111.3, 120.1, 120.2, 120.3, 208/120.35, 136, 146
See application file for complete search history.

(56) References Cited

U.S. PATENT DOCUMENTS

| | | | |
|---|---|---|---|
| 6,049,018 A * | 4/2000 | Calabro et al. ............. 585/446 |
| 6,500,404 B1 * | 12/2002 | Camblor Fernandez et al. ............. 423/706 |
| 7,582,278 B2 * | 9/2009 | Corma Canos et al. ...... 423/718 |
| 7,947,252 B2 * | 5/2011 | Corma Canos et al. ...... 423/718 |
| 2003/0185751 A1 | 10/2003 | Chester et al. |
| 2005/0008567 A1 * | 1/2005 | Corma Canos et al. ...... 423/706 |
| 2005/0238575 A1 | 10/2005 | Corma et al. |
| 2006/0110321 A1 * | 5/2006 | Corma et al. ............. 423/718 |
| 2009/0068092 A1 * | 3/2009 | Corma Canos et al. ...... 423/706 |

* cited by examiner

Primary Examiner — David M Brunsman
(74) Attorney, Agent, or Firm — Leason Ellis LLP

(57) ABSTRACT

The present invention relates to a microporous crystalline material characterized in that it has the following chemical composition in the calcined from:

$$xX_2O_3 \colon nYO_2 \colon mGeO_2$$

in which (n+m) is at least 5, X is one or more trivalent elements, Y corresponds to one or more tetravalent elements other than Ge, "x" may have any value, including zero, and the ratio Y/Ge is greater than 0.1, and it has a characteristic X-ray diffraction pattern. Its also relates to a method for preparing it and to its use in the conversion of organic-compounds supplies.

33 Claims, No Drawings

MICROPOROUS CRYSTALLINE MATERIAL, ZEOLITE ITQ-37, PREPARATION METHOD AND USE

This application is a U.S. national phase application under 35 U.S.C. §371 of International Patent Application No. PCT/ES2007/070036 filed Feb. 22, 2007, which claims the benefit of priority to Spanish Patent Application No. P200600584 filed Feb. 28, 2006, the disclosures of all of which are hereby incorporated by reference in their entireties. The International Application was published in Spanish on Sep. 7, 2007 as WO/2007/099190.

FIELD OF THE INVENTION

The present application relates to a novel microporous crystalline material, ITQ-37, to its method of preparation and its use in the catalytic conversion of organic compounds.

BACKGROUND

Zeolites are porous crystalline aluminosilicates which have found important applications as catalysts, adsorbents and ion exchangers. Many of these zeolitic materials have well-defined structures which form channels and cavities in their interior of uniform size and shape which permit the absorption of certain molecules, whilst they permit the passage to the inside of the crystal of other molecules of a too large size to be diffused through the pores. This characteristic gives these materials molecular screen properties. These molecular screens may include Si and other elements of the IIIA group of the periodic table, all tetrahedrically coordinated, the tetrahedrons being bound by their vertices through oxygens forming a three-dimensional network. The negative charge generated by the elements of the IIIA group in network positions is compensated by the presence in the crystal of cations, such as for example, alkalines or earth alkalines. A type of cation may be totally or partially exchanged by another type of cation by ion exchange techniques, thus being able to vary the properties of a given silicate by selecting the desired cations.

Many zeolites have been synthesized in the presence of an organic molecule which acts as structure-directing agent. The organic molecules which act as structure-directing agents (SDA) generally contain nitrogen in their composition, and give rise to stable organic cations in the reaction medium.

The mobilization of the silica can be carried out in the presence of $OH^-$ groups and basic medium, which can be included as hydroxide as the same SDA, such as, for example, tetrapropylammonium hydroxide in the case of the ZSM-5 zeolite. The fluoride ions can also act as mobilizing agents of silica in zeolite synthesis, as disclosed, for example, in patent EP-A-0337479 the use of HF in $H_2O$ at low pH as mobilizing agent of silica for ZSM-5 synthesis.

DESCRIPTION OF THE INVENTION

The present invention relates to a new microporous crystalline material, ITQ-37, which has a chemical composition in the calcined state represented by the formula:

$$xX_2O_3{:}nYO_2{:}mGeO_2$$

wherein (n+m) is at least 5, X is one or more trivalent elements, Y corresponds to one or several tetravalent elements other than Ge, and the Y/Ge ratio is greater than 0.1, "x" may take any value, including zero, and has an X-ray diffraction pattern whose main lines for its uncalcined synthesized form are:

| (d ± 0.2) (Å) | Relative intensity |
|---|---|
| 18.787 | vs |
| 15.339 | f |
| 11.882 | vw |
| 8.856 | vw |
| 8.402 | vw |
| 8.011 | vw |
| 7.670 | vw |
| 5.210 | vw |
| 3.757 | vw |
| 3.720 | vw |
| 3.321 | vw |
| 2.970 | vw |
| 2.670 | vw | wherein (vs) signifies relative intensity 80-100, "w" signifies relative intensity 20-40 and "vw" signifies relative intensity 0-20, calculated as the percentage with respect to the most intense peak.

This novel material, called ITQ-37, both in its calcined state and uncalcined synthesized state has an X-ray diffraction pattern which is different to the other zeolitic materials and whose most important diffraction lines are given in table 1 for the calcined state.

TABLE 1

| (d ± 0.2) (Å) | Relative intensity |
|---|---|
| 18.852 | vs |
| 15.393 | w |
| 11.923 | vw |
| 10.884 | vw |
| 8.887 | vw |
| 8.431 | vw |
| 8.039 | vw |
| 7.696 | vw |
| 7.394 | vw |
| 7.125 | vw |
| 6.665 | vw |
| 6.284 | vw |
| 6.116 | vw |
| 5.229 | vw |
| 5.131 | vw |
| 4.713 | vw |
| 4.383 | vw |
| 4.164 | vw |
| 4.114 | vw |
| 4.019 | vw |
| 3.848 | vw |
| 3.770 | vw |
| 3.733 | vw |
| 3.662 | vw |
| 3.628 | vw |
| 3.471 | vw |
| 3.333 | vw |

The interplanar spaces, d, were calculated in Angstroms and the relative intensity of the lines is calculated as a percentage with respect to the most intense peak, and the following are considered: very strong (vs)=80-100, strong (s) 60-80, average (a)=40-60, weak (w) 20-40, and very weak (vw)=0-20.

Preferred embodiments of ITQ-37 have in their uncalcined state the diffraction lines shown in Table 2.

TABLE 2

| (d ± 0.2) (Å) | Relative intensity |
|---|---|
| 18.787 | vs |
| 15.339 | w |
| 11.882 | vw |
| 10.846 | vw |
| 8.856 | vw |
| 8.402 | vw |
| 8.011 | vw |
| 7.670 | vw |
| 7.101 | vw |
| 6.262 | vw |
| 6.095 | vw |
| 5.210 | vw |
| 5.113 | vw |
| 4.697 | vw |
| 4.368 | vw |
| 4.149 | vw |
| 4.100 | vw |
| 4.005 | vw |
| 3.961 | vw |
| 3.835 | vw |
| 3.757 | vw |
| 3.720 | vw |
| 3.649 | vw |
| 3.615 | vw |
| 3.489 | vw |
| 3.459 | vw |
| 3.321 | vw |
| 3.110 | vw |
| 3.088 | vw |
| 2.970 | vw |
| 2.882 | vw |
| 2.865 | vw |
| 2.801 | vw |
| 2.712 | vw |
| 2.684 | vw |
| 2.670 | vw |
| 2.593 | vw |
| 2.488 | vw |
| 2.456 | vw |

These diffractograms were obtained with a Philips X'Pert diffractometer equipped with a graphite monochromator and a fixed divergence grille using $K_\alpha$ radiation, of copper. The diffraction data are recorded by a 2θ step of 0.01° wherein θ is Bragg's angle and a count time of 10 seconds per step. The interplanar spaces, d, were calculated in Angstroms and the relative intensity of the lines is calculated as a percentage with respect to the most intense peak, and the following are considered: very strong (vs)=80-100, strong (s) 60-80, average (a)=40-60, weak (w) 20-40, and very weak (vw)=0-20.

It should be borne in mind that the diffraction data listed for this sample as simple or unique lines, may be formed by multiple overlapping or superposition of reflections which, in certain conditions, such as differences in crystallographic changes, may appear as resolved or partially resolved lines. Generally, the crystallographic changes may include small variations in the parameters of the unit cell and/or changes in the symmetry of the crystal, without a change in the structure occurring. These modifications, which also include changes in relative intensity, may also be due to changes in the type and quantity of compensation cations, network composition, crystal size and form thereof, preferred orientation or the type of thermal or hydrothermal treatments undergone.

In the general formula previously shown, "m" may have the value zero.

The crystalline material preferably has a composition in its anhydrous calcined form, represented by:

$$X_2O_3 : nYO_2 : mGeO_2$$

wherein (n+m) is at least 5, and the value n/m is at least 0.1, X is one or more trivalent elements selected from the group of Al, B, In, Ga, Fe, Cr and combinations thereof.

Also preferably, the crystalline material in its anhydrous calcined state represented by the previous formula wherein (n+m) is at least 5, and the value n/m is at least 0.1, Y is one or more tetravalent elements selected from Si, Sn, Ti, V and combinations thereof.

Even more preferably, the crystalline material in its anhydrous calcined state represented by the previous formula is that (n+m) is at least 5, and the value n/m is at least 0.1, X is one or more trivalent elements selected from the group of Al, B, In, Ga, Fe, Cr and combinations thereof and Y is one or more tetravalent elements selected from Si, Sn, Ti, V and combinations thereof.

An especially preferred embodiment is that wherein the crystalline material has the aforementioned formula, wherein X is selected from B, Al and a mixture of both; and Y is Si.

From the given values, it is clearly deduced that the crystalline material ITQ-37 can be synthesized in the absence of added trivalent elements.

The organic component of the material as it has been synthesized, can be eliminated, for example by extraction or by thermal treatment heating to a temperature above 250° C. during a time period of between 2 minutes and 25 hours.

The compensation cations in the material in its uncalcined state, or after a thermal treatment, can be exchanged, if they are present, for other cations such as metal cations, $H^+$ and precursors of $H^+$ such as, for example, $NH_4^+$. Among the cations that may be introduced by ion exchange, those preferred may have a positive role in the activity of the material as a catalyst, and more specifically, cations are preferred such as $H^+$, rare earth cations, and metals of group VIII, as well as of group IIA, IIIA, IVA, VA, IB, IIB, IIIB, IVB, VB, VIIB of the periodic table of elements.

The crystalline material of the present invention may also be closely combined with one or more hydrogenating-dehydrogenating components such as platinum, palladium, nickel, rhenium, cobalt, tungsten, molybdenum, vanadium, chromium, manganese, iron and combinations thereof. The introduction of these elements can be carried out in the crystalline stage, by exchange (if any), and/or by impregnation or by physical mixture. These elements can be introduced in their cationic form and/or from salts or other compounds which, by decomposition, generate the metal or oxide component in its suitable cationic form.

The present invention also relates to a method for the preparation of the aforementioned crystalline material, which comprises at least:

preparing a synthesis mixture which comprises at least $H_2O$, a source of one or more tetravalent elements Y and an organic compound as structure-directing agent (R), maintaining the synthesis mixture at a temperature between 60 and 200° C. until the crystals of the porous crystalline material are formed; and recovering the crystalline material.

According to a preferred embodiment, the method for the preparation of the aforementioned crystalline material comprises at least:

preparing a synthesis mixture which comprises at least:
$H_2O$
an oxide of one or more tetravalent elements Y,
and an organic component as structure-directing agent (R),
with molar ratios referring to the oxides:

| $H_2O/(YO_2)$ | 1-50 |
|---|---|
| $R/(YO_2)$ | 0.1-3.0 | maintaining the synthesis mixture at a temperature between 60 and 200° C. until the crystals of the porous crystalline material are formed; and recovering the crystalline material.

In this embodiment, and in an especially preferred manner, the molar ratios referring to the oxide are:

| | |
|---|---|
| $H_2O/(YO_2)$ | 1-20 |
| $R/(YO_2)$ | 0.1-1.0 |

An additional preferred embodiment of the method comprises:

preparing a synthesis mixture which comprises at least $H_2O$, a source of one or more tetravalent elements Y, a source of fluoride ions and an organic compound as structure-directing agent (R), maintaining the synthesis mixture at a temperature between 60 and 200° C. until the crystals of the porous crystalline material are formed; and recovering the crystalline material.

According to a preferred embodiment, the method for the preparation of the aforementioned crystalline material comprises at least:

preparing a synthesis mixture which comprises at least:
$H_2O$
an oxide of one or more tetravalent elements Y,
a source of fluoride ions
and an organic component as structure-directing agent (R), with molar ratios referring to the oxides:

| | |
|---|---|
| $H_2O/(YO_2)$ | 1-50 |
| $R/(YO_2)$ | 0.1-3.0 |
| $F^-/(YO_2)$ | 0.1-3.0 | maintaining the synthesis mixture at a temperature between 60 and 200° C. until the crystals of the porous crystalline material are formed; and recovering the crystalline material.

In this embodiment, and in an especially preferred manner, the molar ratios referring to the oxide are:

| | |
|---|---|
| $H_2O/(YO_2)$ | 1-20 |
| $R/(YO_2)$ | 0.1-1.0 |
| $F^-/(YO_2)$ | 0.1-1.0 |

Another additional preferred embodiment of the method comprises:

preparing a synthesis mixture which comprises at least $H_2O$, a source of one or more tetravalent elements Y, a source of Ge, a source of fluoride ions and an organic compound as structure-directing agent (R), maintaining the synthesis mixture at a temperature between 60 and 200° C. until the crystals of the porous crystalline material are formed; and recovering the crystalline material.

According to a preferred embodiment, the method for the preparation of the aforementioned crystalline material comprises at least:

preparing a synthesis mixture which comprises at least:
$H_2O$
an oxide of one or more tetravalent elements Y,
Ge oxide
a source of fluoride ions
and an organic component as structure-directing agent (R), with molar ratios referring to the oxides:

| | |
|---|---|
| $H_2O/(YO_2 + GeO_2)$ | 1-50 |
| $R/(YO_2 + GeO_2)$ | 0.1-3.0 |
| $F^-/(YO_2 + GeO_2)$ | 0.1-3.0 |
| $YO_2/GeO_2$ | greater than 0.1 | maintaining the synthesis mixture at a temperature between 60 and 200° C. until the crystals of the porous crystalline material are formed; and recovering the crystalline material.

In this embodiment, and in an especially preferred mariner, the molar ratios referring to the oxide are:

| | |
|---|---|
| $H_2O/(YO_2 + GeO_2)$ | 1-20 |
| $R/(YO_2 + GeO_2)$ | 0.1-1.0 |
| $F^-/(YO_2 + GeO_2)$ | 0.1-1.0 |
| $YO_2/GeO_2$ | greater than 0.1 |

Another additional preferred embodiment of the method comprises:

preparing a synthesis mixture which comprises at least $H_2O$, a source of one or more trivalent elements X; a source of one or more tetravalent elements Y, and an organic compound as structure-directing agent (R), maintaining the synthesis mixture at a temperature between 60 and 200° C. until the crystals of the porous crystalline material are formed; and recovering the crystalline material.

Another additional preferred embodiment of the method comprises:

preparing a synthesis mixture which comprises at least $H_2O$, an oxide of one or more trivalent elements X; an oxide of one or more tetravalent elements Y, a source of fluoride ions and an organic compound as structure-directing agent (R), with molar ratios referring to the oxides:

| | |
|---|---|
| $H_2O/X_2O_3$ | At least 5 |
| $H_2O/YO_2$ | between 1 and 50 |
| $R/YO_2$ | between 0.1 and 3.0 |
| $F^-/(YO_2)$ | between 0.1 and 3.0 | maintaining the synthesis mixture at a temperature between 60 and 200° C. until the crystals of the porous crystalline material are formed; and recovering the crystalline material.

According to the previous embodiment, the molar ratios referring to the preferred oxides are:

| | |
|---|---|
| $H_2O/X_2O_3$ | greater than 7 |
| $H_2O/YO_2$ | between 1 and 20 |
| $R/YO_2$ | between 0.1 and 1.0 |
| $F^-/(YO_2)$ | between 0.1 and 1.0 |

Another additional preferred embodiment of the method comprises:

preparing a synthesis mixture which comprises at least $H_2O$, a source of one or more trivalent elements X; a source of one or more tetravalent elements Y, Ge oxide, a source of fluoride ions and an organic compound as structure-directing agent (R), maintaining the synthesis mixture at a temperature between 60 and 200° C. until the crystals of the porous crystalline material are formed; and recovering the crystalline material.

An additional preferred embodiment of the method comprises:

preparing a synthesis mixture which comprises at least $H_2O$, an oxide of one or more trivalent elements X; an oxide of one or more tetravalent elements Y, Ge oxide, a source of fluoride ions and an organic compound as structure-directing agent (R), with molar ratios referring to the oxides:

| | |
|---|---|
| $(YO_2 + GeO_2)/X_2O_3$ | greater than 5 |
| $H_2O/(YO_2 + GeO_2)$ | between 1 and 50 |
| $R/(YO_2 + GeO_2)$ | between 0.1 and 3.0 |
| $F^-/(YO_2 + GeO_2)$ | between 0.1 and 3.0 |
| $YO_2/GeO_2$ | greater than 0.1 | maintaining the synthesis mixture at a temperature between 60 and 200° C. until the crystals of the porous crystalline material are formed; and recovering the crystalline material.

According to this embodiment, the molar ratios referring to the preferred oxides are preferably:

| | |
|---|---|
| $(YO_2 + GeO_2)/X_2O_3$ | greater than 7 |
| $H_2O/(YO_2 + GeO_2)$ | between 1 and 20 |
| $R/(YO_2 + GeO_2)$ | between 0.1 and 1.0 |
| $F^-/(YO_2 + GeO_2)$ | between 0.1 and 1.0 |
| $YO_2/GeO_2$ | greater than 0.1 |

In any embodiment of the method of the present invention ITQ-37 zeolite crystals can be added to the synthesis mixture (up to 25% by weight) which act as seed.

In any embodiment of the method of the present invention the organic compound used as structure-directing agent is preferably selected from an amine and a tetraalkylammonium salt, preferably hydroxide.

The method of the present invention, when the aim is to produce the calcined crystalline material, comprises a stage of elimination of organic material occluded inside the material, which can be performed by extraction and/or thermal treatment at temperatures over 25° C. during a period of time of between 2 minutes and 25 hours.

According to an additional preferred embodiment of the process of the present invention, this comprises:

preparing a synthesis mixture which comprises at least $H_2O$, an oxide of one or more trivalent elements X selected from Al, B and mixture of both, an oxide of Si, Ge oxide, a source of fluoride ions and a 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro salt as R, with molar ratios referring to the oxides:

| | |
|---|---|
| $(SiO_2 + GeO_2)/X_2O_3$ | at least 5 |
| $H_2O/(SiO_2 + GeO_2)$ | between 1 and 50 |
| $R/(SiO_2 + GeO_2)$ | between 0.1 and 3.0 |
| $F^-/(SiO_2 + GeO_2)$ | between 0.1 and 3.0 |
| $SiO_2/GeO_2$ | greater than 0.1 | maintaining the synthesis mixture at a temperature between 60 and 200° C. until the crystals of the porous crystalline material are formed; and recovering the crystalline material.

The crystallization of ITQ-37 can be carried out in static or with stirring, in autoclaves at temperatures between 60 and 200° C., at sufficient times to achieve crystallization, for example, between 2 hours and 60 days.

At the end of the crystallization stage, the ITQ-37 crystals are separated from the mother liquor, and they are recovered. It should be taken into consideration that the components of the synthesis mixture may come from different sources, and depending on them times and crystallization conditions may vary. In order to facilitate the synthesis, ITQ-37 crystals can be added as seeds, in quantities of up to 25% by weight with respect to the total of oxides, to the synthesis mixture. These can be added before or during the crystallization of ITQ-37.

The material produced by this invention may be pelletized in accordance with known techniques. They can also be used in different processes.

Preferably, said process is selected from catalytic cracking of hydrocarbons and catalytic hydrocracking of hydrocarbons.

Also preferably, said process is selected from alkylation processes such as alkylation of aromatics with olefins, esterification processes and acylation. The material produced by this invention may be in its acid form, exchanged with suitable cations and/or a combination of both. Preferably, the material is present as a component of other catalysts.

The present invention also relates to a method for converting feed products formed by organic compounds, characterized in that it comprises placing in contact the feed products with an active form of porous crystalline material of the invention.

Preferably, the method is selected from catalytic cracking of hydrocarbons and catalytic hydrocracking of hydrocarbons.

Also preferably, the method is selected from alkylation processes such as alkylation of aromatics with olefins, esterification processes and acylation.

Preferably, the method comprises the pelletization of the material in a form selected from its acid form, exchange with cations and a combination of both. More preferably, the material is present as a component of other catalysts.

EXAMPLES

Example 1

Synthesis of the Structure-Directing Agent 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide 5.05 g (40.7 mmol) of 4,6-dimethyl-2-pyrone and 7.9 g (81.5 mmol) of maleic anhydride are heated under toluene reflux (100 mL) during four days. The precipitate produced is vacuum filtered and it is washed with hexane, quantitatively producing (11.1 g) of desired dianhydride.

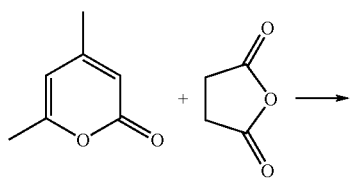

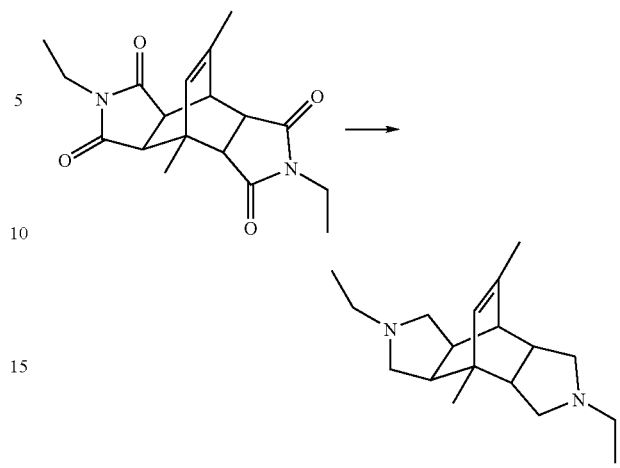

11.1 g (40.2 mmol) of dianhydride are heated to 75° C. for 5 days, in the presence of 250 mL of an ethylamine solution in water (70%). After this period, it is partially vacuum concentrated with a precipitate appearing which is filtered and vacuum dried producing 12.0 g of the expected diimide (90.5%).

4.8 g (17.5 mmol) of the diamine are dissolved in 25 mL of EtOH, adding to the solution 4.2 mL of $CH_3CH_2I$ (52 mmol) drop by drop. The mixture is heated under reflux during four days, the resulting precipitate is vacuum filtered producing 9.9 g of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro iodide with two $H_2O$ molecules of crystallization (91% performance).

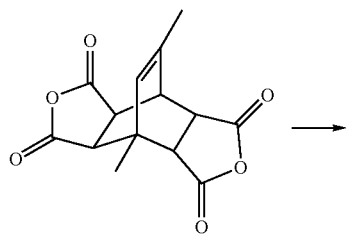

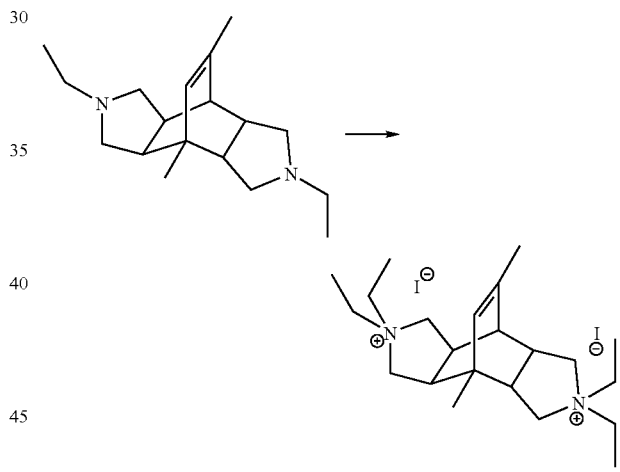

3.8 g of $LiAlH_4$ (100.0 mmol) are purged with $N_2$ and they are suspended in 100 mL of anhydrous THF. The mixture is introduced in an ice bath and on it are slowly added 6.7 g (20.1 mmol) of the diimide produced in the previous step. After the addition it is heated under reflux for 6 hours, then continuously stirred at ambient temperature throughout the night.

After this period, the mixture is introduced in an ice bath and 4 mL of $H_2O$, 3 ml of NaOH (15%) and 3 mL of $H_2O$ are added, maintaining under stirring at ambient temperature for 1 hour. The crude is filtered and the filtrate is concentrated until almost desiccated. It is poured on $H_2O$ being extracted with $CH_2Cl_2$, it is dried on $Na_2SO_4$ and it is concentrated producing 4.8 g of the diamine (87%).

The iodide is exchanged with hydroxide using ion exchange resin.

Example 2

ITQ-37 Synthesis 0.131 g of $GeO_2$ are dissolved in 1,124 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (20.3% weight). 0.195 g of Ludox AS-40 is added to the previous solution, and when the gel is completely homogenous, 0.466 g of an ammonium fluoride solution (10% weight) is added, leaving the mixture to evaporate under stirring until reaching the final composition:

$$0.51SiO_2:0.49GeO_2:0.24R(OH)_2:0.49NH_4F:5.00H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated during 20 hours in steel autoclaves with an internal Teflon cover at 175° C. in static. The solid obtained after filtration, washing with distilled water and drying at 100° C. is ITQ-37.

The material is calcined at 540° C. for 3 hours in air flow to eliminate the organic matter. The X-ray diffraction pattern of powder of the solid obtained coincides with the values of table 1.

Example 3

0.115 g of $GeO_2$ are dissolved in 1,240 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (16.2% weight). 0.173 g of Ludox AS-40 is added to the previous solution, and when the gel is completely homogenous, 0.402 g of an ammonium fluoride solution (10% weight) is added, leaving the mixture to evaporate under stirring until reaching the final composition:

$$0.51SiO_2{:}0.49GeO_2{:}0.24R(OH)_2{:}0.48NH_4F{:}3.10H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated for 20 hours in steel autoclaves with an internal Teflon cover at 175° C. in static. The solid obtained after filtration, washing with distilled water and drying at 100° C. is ITQ-37.

Example 4

0.131 g of $GeO_2$ are dissolved in 1,061 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (21.7% weight). 0.068 g of a solution of $H_3BO_4$ (5% weight) and 0.186 g of Ludox AS-40 are added to the previous solution, and when the gel is completely homogenous, 0.456 g of an ammonium fluoride solution (10% weight) is added, leaving the mixture to evaporate under stirring until reaching the final composition:

$$0.51SiO_2{:}0.49GeO_2{:}0.01B_2O_3{:}0.24R(OH)_2{:}\\0.48NH_4F{:}5H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated for 6 hours in steel autoclaves with an internal Teflon cover at 175° C. in static. The solid obtained after filtration, washing with distilled water and drying at 100° C. is ITQ-37.

Example 5

0.174 g of $GeO_2$ are dissolved in 1,119 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (20.3% weight). 0.132 g of Ludox AS-40 is added to the previous solution, and when the gel is completely homogenous, 0.461 g of an ammonium fluoride solution (10% weight) is added, leaving the mixture to evaporate under stirring until reaching the final composition:

$$0.35SiO_2{:}0.65GeO_2{:}0.24R(OH)_2{:}0.48NH_4F{:}3H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated for 20 hours in steel autoclaves with an internal Teflon cover at 175° C. in static. The solid obtained after filtration, washing with distilled water and drying at 100° C. is ITQ-37.

Example 6

0.077 g of $GeO_2$ are dissolved in 1,053 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (19% weight). 0.219 g of Ludox AS-40, and finally, 0.409 g of ammonium fluoride solution (10% weight) is added, leaving the mixture to evaporate under stirring until the reaction mixture reaches a final composition:

$$0.34SiO_2{:}0.66GeO_2{:}0.25R(OH)_2{:}0.50NH_4F{:}5H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated for 2 days in steel autoclaves with an internal Teflon cover at 175° C. in static. The solid obtained after filtration, washing with distilled water and drying at 100° C. is ITQ-37.

Example 7

0.131 g of $GeO_2$ are dissolved in 1,046 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (21.7% weight). 0.071 g of a solution of $H_3BO_4$ (5% weight) and 0.192 g of Ludox AS-40 is added to the previous solution, and when the gel is completely homogenous, 0.474 g of an ammonium fluoride solution (10% weight) is added, leaving the mixture to evaporate under stirring until reaching the final composition:

$$0.50SiO_2{:}0.50GeO_2{:}0.023H_2BO_3{:}0.25R(OH)_2{:}\\0.50NH_4F{:}5H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated for 14 days in steel autoclaves with an internal Teflon cover at 175° C. in static. The solid obtained after filtration, washing with distilled water and drying at 100° C. is ITQ-37.

Example 8

0.131 g of $GeO_2$ are dissolved in 1,061 g of a solution of 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide (21.7% weight). 0.003 g of $Al_2O_3$ and 0.185 g Ludox AS-40 are added to the previous solution, and when the gel is completely homogenous, 0.468 g of an ammonium fluoride solution (10% weight) is added, leaving the mixture to evaporate under stirring until reaching the final composition:

$$0.50SiO_2{:}0.50GeO_2{:}0.012Al_2O_3{:}0.25R(OH)_2{:}\\0.50NH_4F{:}5H_2O$$

where R is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro.

The gel is heated for 20 hours in steel autoclaves with an internal Teflon cover at 175° C. in static. The solid obtained is ITQ-37.

The invention claimed is:

1. A porous crystalline material comprising a chemical composition in calcined state represented by the formula:

$$xX_2O_3:nYO_2:mGeO_2$$

wherein:
(n+m) is at least 5;
X is one or more trivalent elements;
Y is one or more tetravalent elements other than Ge;
x is an integer; and
the Y/Ge ratio is greater than 0.1; and
wherein the crystalline material has an X-ray diffraction pattern having the following main lines for its calcined state:

| (d ± 0.2) (Å) | Relative intensity |
|---|---|
| 18.852 | vs |
| 15.393 | w |
| 11.923 | vw |
| 8.887 | vw |
| 8.431 | vw |
| 8.039 | vw |
| 7.696 | vw |
| 3.770 | vw |
| 3.733 | vw |
| 3.662 | vw |
| 3.628 | vw |
| 3.471 | vw |
| 3.333 | vw | wherein "vs" signifies relative intensity 80-100, "w" signifies relative intensity 20-40, and "vw" signifies relative intensity 0-20, each calculated as a percentage with respect to the most intense peak.

2. A porous crystalline material comprising a chemical composition in calcined state represented by the formula:

$$xX_2O_3:nYO_2:mGeO_2$$

wherein:
(n+m) is at least 5;
X is one or more trivalent elements;
Y is one or more tetravalent elements other than Ge;
x is an integer; and
the Y/Ge ratio is greater than 0.1; and
wherein the crystalline material has an X-ray diffraction pattern having the following main lines for its uncalcined synthesized form:

| (d ± 0.2) (Å) | Relative intensity |
|---|---|
| 18.787 | vs |
| 15.339 | s |
| 11.882 | vw |
| 8.856 | vw |
| 8.402 | vw |
| 8.011 | vw |
| 7.670 | vw |
| 5.210 | vw |
| 3.757 | vw |
| 3.720 | vw |
| 3.321 | vw |
| 2.970 | vw |
| 2.670 | vw | wherein "vs" signifies relative intensity 80-100, "w" signifies relative intensity 20-40, and "vw" signifies relative intensity 0-20, each calculated as a percentage with respect to the most intense peak.

3. The crystalline material according to claim 2, wherein X is one or more trivalent elements selected from the group consisting of Al, B, In, Ga, Fe, Cr, and combinations thereof.

4. The crystalline material according to claim 3, wherein:
X is selected from the group consisting of B, Al, and mixtures thereof; and
Y is Si.

5. The crystalline material according to claim 2, wherein Y is one or more tetravalent elements selected from the group consisting of: Si, Sn, Ti, V, and combinations thereof.

6. The crystalline material according to claim 2, wherein:
X is one or more trivalent elements selected from the group consisting of: Al, B, In, Ga, Fe, Cr, and combinations thereof; and
Y is one or more tetravalent elements selected from the group consisting of Si, Sn, Ti, V, and combinations thereof.

7. A catalyst comprising the crystalline material of claim 2 combined with one or more hydrogenating-dehydrogenating components.

8. The catalyst according to claim 7, wherein the hydrogenating-dehydrogenating components are selected from the group consisting of: platinum, palladium, nickel, rhenium, cobalt, tungsten, molybdenum, vanadium, chromium, manganese, iron, and combinations thereof.

9. A method for preparing the crystalline material of claim 2, comprising the steps of:
(a) preparing a synthesis mixture comprising:
(1) $H_2O$,
(2) a source of one or more tetravalent elements Y, and
(3) an organic compound as structure-directing agent (R);
(b) maintaining the synthesis mixture at a temperature of 60 to 200° C. until crystals of the porous crystalline material are formed; and
(c) recovering the crystalline material.

10. The method according to claim 9,
wherein the synthesis mixture comprises:
(1) $H_2O$,
(2) a source of one or more trivalent elements X,
(3) a source of one or more tetravalent elements Y, and
(4) an organic compound as structure-directing agent (R).

11. The method according to claim 10,
wherein the synthesis mixture comprises:
(1) $H_2O$,
(2) an oxide of one or more trivalent elements X selected from the group consisting of Al, B, and mixtures thereof,
(3) an oxide of Si,
(4) Ge oxide,
(5) a source of fluoride ions and
(6) a 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro salt as structure-directing agent (R), wherein the synthesis mixture has oxide molar ratios of:

| | |
|---|---|
| $(SiO_2 + GeO_2)/X_2O_3$ | at least 5 |
| $H_2O/(SiO_2 + GeO_2)$ | between 1 and 50 |
| $R/(SiO_2 + GeO_2)$ | between 0.1 and 3.0 |
| $F^-/(SiO_2 + GeO_2)$ | between 0.1 and 3.0 |
| $SiO_2/GeO_2$ | greater than 0.1. |

12. The method according to claim 9,
wherein the synthesis mixture comprises:
(1) $H_2O$,
(2) a source of one or more trivalent elements X,
(3) a source of one or more tetravalent elements Y, (4) a source of fluoride ions, and
(5) an organic compound as structure-directing agent (R).

13. The method according to claim 12,
wherein the synthesis mixture comprises:
(1) $H_2O$,
(2) a source of one or more trivalent elements X,
(3) a source of one or more tetravalent elements Y,
(4) a source of fluoride ions, and
(5) an organic compound as structure-directing agent (R),
wherein the synthesis mixture has oxide molar ratios of:

| | |
|---|---|
| $YO_2/X_2O_3$ | at least 5 |
| $H_2O/YO_2$ | between 1 and 50 |
| $R/YO_2$ | between 0.1 and 3.0 |
| $F^-/(YO_2)$ | between 0.1 and 3.0. |

14. The method according to claim 13, wherein the oxide molar ratios referring are:

| | |
|---|---|
| $YO_2/X_2O_3$ | greater than 7 |
| $H_2O/YO_2$ | between 1 and 20 |
| $R/YO_2$ | between 0.1 and 1.0 |
| $F^-/(YO_2)$ | between 0.1 and 1.0. |

15. The method according to claim 12,
wherein the synthesis mixture comprises:
(1) $H_2O$,
(2) a source of one or more trivalent elements X,
(3) a source of one or more tetravalent elements Y,
(4) Ge oxide,
(5) a source of fluoride ions, and
(6) an organic compound as structure-directing agent (R).

16. The method according to claim 15,
wherein the synthesis mixture has oxide molar ratios of:

| | |
|---|---|
| $(YO_2 + GeO_2)/X_2O_3$ | greater than 5 |
| $H_2O/(YO_2 + GeO_2)$ | between 1 and 50 |
| $R/(YO_2 + GeO_2)$ | between 0.1 and 3.0 |
| $F^-/(YO_2 + GeO_2)$ | between 0.1 and 3.0 |
| $YO_2/GeO_2$ | greater than 0.1. |

17. The method according to claim 16, wherein the oxide molar ratios are:

| | |
|---|---|
| $(YO_2 + GeO_2)/X_2O_3$ | greater than 7 |
| $H_2O/(YO_2 + GeO_2)$ | between 1 and 20 |
| $R/(YO_2 + GeO_2)$ | between 0.1 and 1.0 |
| $F^-/(YO_2 + GeO_2)$ | between 0.1 and 1.0 |
| $YO_2/GeO_2$ | greater than 0.1. |

18. The method according to claim 9, wherein the synthesis mixture comprises ITQ-37 zeolite seed crystals.

19. The method according to claim 18, wherein the ITQ-37 zeolite seed crystals are added in a proportion of up to 25% by weight with respect to the total weight of oxides.

20. The method according to claim 9, wherein the organic compound used as structure-directing agent (R) is an amine or a tetraalkylammonium salt.

21. The method according to claim 9, wherein the organic compound used as structure-directing agent (R) is 4,8-(2-methyl)-ethenobenzo[1,2-c:4,5-c']dipyrrolium-4-methyl-2,2,6,6-tetraethyl-1,2,3,3a,4a,5,6,7,7a,8a-decahydro hydroxide.

22. The method according to claim 9, comprising the step of eliminating organic matter occluded inside the crystalline material.

23. The method according to claim 22, wherein the step of eliminating organic matter is performed by extraction, thermal treatment at temperatures over 250° C. during a period of 2 minutes to 25 hours, or a combination of both.

24. A method for preparing the crystalline material of claim 2, comprising the steps of:
(a) preparing a synthesis mixture comprising:
(1) $H_2O$,
(2) a source of one or more tetravalent elements Y, and
(3) an organic component as structure-directing agent (R),
wherein the synthesis mixture has oxide molar ratios of:

| | |
|---|---|
| $H_2O/(YO_2)$ | 1-50 |
| $R/(YO_2)$ | 0.1-3.0 |

(b) maintaining the synthesis mixture at a temperature of 60 to 200° C. until crystals of the porous crystalline material are formed; and
(c) recovering the crystalline material.

25. The method according to claim 24, wherein the oxide molar ratios are:

| | |
|---|---|
| $H_2O/(YO_2)$ | 1-20 |
| $R/(YO_2)$ | 0.1-1.0. |

26. The method for preparing the crystalline material of claim 2, comprising the steps of:
(a) preparing a synthesis mixture comprising:
(1) $H_2O$,
(2) a source of one or more tetravalent elements Y,
(3) a source of fluoride ions, and
(4) an organic compound as structure-directing agent (R),
(b) maintaining the synthesis mixture at a temperature of 60 to 200° C. until crystals of the porous crystalline material are formed; and
(c) recovering the crystalline material.

27. The method according to claim 26, wherein:
the synthesis mixture comprises:
(1) $H_2O$,
(2) an oxide of one or more tetravalent elements Y,
(3) a source of fluoride ions, and
(4) an organic component as structure-directing agent (R),
wherein the synthesis mixture has oxide molar ratios of:

| | |
|---|---|
| $H_2O/(YO_2)$ | 1-50 |
| $R/(YO_2)$ | 0.1-3.0 |
| $F^-/(YO_2)$ | 0.1-3.0. |

28. The method according to claim 27, wherein the oxide molar ratios are:

| | |
|---|---|
| $H_2O/(YO_2)$ | 1-20 |
| $R/(YO_2)$ | 0.1-1.0 |
| $F^-/(YO_2)$ | 0.1-1.0. |

29. The method according to claim 26,
wherein the synthesis mixture comprises:
  (1) $H_2O$,
  (2) a source of one or more tetravalent elements Y,
  (3) a source of Ge,
  (4) a source of fluoride ions, and
  (5) an organic compound as structure-directing agent (R).

30. The method according to claim 29,
wherein the synthesis mixture comprises:
  (1) $H_2O$,
  (2) a source of one or more tetravalent elements Y,
  (3) a source of Ge,
  (4) a source of fluoride ions, and
  (5) an organic compound as structure-directing agent (R), wherein the synthesis mixture has oxide molar ratios of:

| | |
|---|---|
| $H_2O/(YO_2 + GeO_2)$ | 1-50 |
| $R/(YO_2 + GeO_2)$ | 0.1-3.0 |
| $F^-/(YO_2 + GeO_2)$ | 0.1-3.0 |
| $YO_2/GeO_2$ | greater than 1. |

31. The method according to claim 30, wherein the oxide molar ratios are:

| | |
|---|---|
| $H_2O/(YO_2 + GeO_2)$ | 1-20 |
| $R/(YO_2 + GeO_2)$ | 0.1-1.0 |
| $F^-/(YO_2 + GeO_2)$ | 0.1-1.0 |
| $YO_2/GeO_2$ | greater than 1. |

32. A method of catalyzing the conversion of feed products formed by organic compounds, comprising placing the feed product in contact with an active form of the crystalline material of claim 2; and converting the feed product by a step selected from catalytic cracking of hydrocarbons and catalytic hydrocracking of hydrocarbons.

33. A method of catalyzing the conversion of feed products formed by organic compounds, comprising placing the feed product in contact with an active form of the crystalline material of claim 2; and converting the feed product by a process selected from the group consisting of alkylation, esterification, and acylation.

* * * * *